United States Patent
Müller et al.

(10) Patent No.: US 12,065,097 B2
(45) Date of Patent: Aug. 20, 2024

(54) CONTROL DEVICE FOR A GAS GENERATOR FOR CONTROLLING A VOLUMETRIC FLOW, AND IMPACT PROTECTION SYSTEM AND METHOD FOR OPERATING A CONTROL DEVICE OF THIS TYPE

(71) Applicant: Continental Automotive GmbH, Hannover (DE)

(72) Inventors: Andreas Müller, Wenzenbach (DE); Matthias Bleeck, Pentling (DE)

(73) Assignee: Continental Automotive GmbH, Hannover (DE)

( * ) Notice: Subject to any disclaimer, the term of this patent is extended or adjusted under 35 U.S.C. 154(b) by 236 days.

(21) Appl. No.: 17/629,511

(22) PCT Filed: Jul. 9, 2020

(86) PCT No.: PCT/DE2020/200056
§ 371 (c)(1),
(2) Date: Jan. 24, 2022

(87) PCT Pub. No.: WO2021/013313
PCT Pub. Date: Jan. 28, 2021

(65) Prior Publication Data
US 2022/0242359 A1    Aug. 4, 2022

(30) Foreign Application Priority Data
Jul. 22, 2019 (DE) ..................... 10 2019 210 802.4

(51) Int. Cl.
*B60R 21/264* (2006.01)
*B60R 21/01* (2006.01)
(Continued)

(52) U.S. Cl.
CPC ............ *B60R 21/264* (2013.01); *B60R 21/01* (2013.01); *F16K 31/406* (2013.01); *B60R 2021/01225* (2013.01); *B60R 2021/26094* (2013.01)

(58) Field of Classification Search
CPC ......... B60R 2021/01211; B60R 21/264; B60R 21/26; F16K 31/406
See application file for complete search history.

(56) References Cited

U.S. PATENT DOCUMENTS

| 1,055,161 A * | 3/1913 | Geissinger | E03C 1/108 251/34 |
| 2002/0140217 A1* | 10/2002 | Wynsberghe | B60R 21/26 280/741 |

(Continued)

FOREIGN PATENT DOCUMENTS

| DE | 4041049 A1 * | 7/1992 |
| DE | 102007003320 A1 | 4/2008 |

(Continued)

OTHER PUBLICATIONS

Beling, Nov. 2016, DE-102015209019-A1, Machine Translation of Specification.*

(Continued)

*Primary Examiner* — Amy R Weisberg
*Assistant Examiner* — Matthew Joseph Ganci

(57) ABSTRACT

A control device for a gas generator for controlling a volumetric flow of a fluid, which is stored under pressure, for filling an airbag of a motor vehicle, with a valve arrangement. To reduce a response time of a main valve piston, the valve arrangement has a means for controlling a fluid pressure in a control chamber, wherein the means for controlling a fluid pressure is configured to bring or hold the fluid pressure in the control chamber to/at a pressure which (Continued)

lies in a predefined tolerance range around an activation pressure of the main valve piston.

14 Claims, 2 Drawing Sheets

(51) Int. Cl.
*B60R 21/26* (2011.01)
*F16K 31/40* (2006.01)

(56) References Cited

U.S. PATENT DOCUMENTS

| | | |
|---|---|---|
| 2010/0032605 A1 | 2/2010 | Helmut |
| 2010/0175764 A1 | 7/2010 | Cecchin et al. |
| 2016/0059820 A1 | 3/2016 | Raed |
| 2021/0039577 A1 | 2/2021 | Aumueller |

FOREIGN PATENT DOCUMENTS

| | | | |
|---|---|---|---|
| DE | 102012202837 A1 | 8/2013 | |
| DE | 102012210943 A1 | 1/2014 | |
| DE | 102013207594 A1 | 10/2014 | |
| DE | 102014210156 A1 | 12/2015 | |
| DE | 102015209019 A1 * | 11/2016 | |
| DE | 102015209019 A1 | 11/2016 | |
| DE | 102018204825 A1 | 10/2019 | |
| WO | WO-9418034 A1 * | 8/1994 | ........... B60R 21/268 |

OTHER PUBLICATIONS

Matschi, Jul. 1994, DE 4041049 A1, Machine Translation of Specification.*
German Search Report dated Mar. 31, 2020 for the counterpart German Patent Application No. 10 2019 210 802.4.
The International Search Report and the Written Opinion of the International Searching Authority mailed on Nov. 6, 2020 for the counterpart PCT Application No. PCT/DE2020/200056.

* cited by examiner

CONTROL DEVICE FOR A GAS GENERATOR FOR CONTROLLING A VOLUMETRIC FLOW, AND IMPACT PROTECTION SYSTEM AND METHOD FOR OPERATING A CONTROL DEVICE OF THIS TYPE

CROSS-REFERENCE TO RELATED APPLICATION(S)

The present application is a National Stage Application under 35 U.S.C. 371 of International Patent Application No. PCT/DE2020/200056 filed on Jul. 9, 2020, which claims priority from German Patent Application No. 10 2019 210 802.4 filed on Jul. 22, 2019, in the German Patent and Trade Mark Office, the disclosures of which are herein incorporated by reference in their entireties.

BACKGROUND

1. Field

Embodiments of the present application relate to a control device for a gas generator for controlling a volumetric flow of a fluid, which is stored under pressure, for filling an airbag of a motor vehicle, with a valve arrangement. The valve arrangement comprises a main valve having a main valve body with a through-opening and a main valve piston axially movable in the through-opening of the main valve body, and an electrically actuatable pilot valve with a pilot valve piston and a pilot valve inlet bore. The main valve piston divides the through-opening into a control chamber fluidically connected to the pilot valve via the pilot valve inlet bore and an antechamber fluidically connectable to the gas generator, wherein the main valve has an overflow channel which fluidically connects the antechamber and the control chamber to one another. Within the main valve body, at least one discharge bore for draining the fluid into the airbag branches off from the through-opening, wherein by means of the fluid and depending on a position of the pilot valve piston, the main valve piston seals the at least one discharge bore in a first operating position and exposes the at least one discharge bore in a second operating position. Furthermore, embodiments relate to an impact protection system for a motor vehicle, having a gas generator for storing a fluid under pressure and an airbag, wherein the gas generator is configured to provide the fluid for the airbag in response to an activation signal, and having such a control device for controlling a volumetric flow of the fluid stored under pressure, wherein the antechamber of the through-opening of the main valve is fluidically connected to a fluid outlet channel of the gas generator. In addition, embodiments relate to a method for operating such a control device.

2. Description of Related Art

Personal protection means in motor vehicles, such as in particular an impact protection system embodied as a restraint system for protecting the occupants of a motor vehicle in the event of an accident, which are intended to prevent injuries to the occupants as far as possible or at least to reduce the severity thereof, have been known for many years. In this case, airbags are usually utilized, the actual airbag whereof that catches the occupant in the event of a collision is filled with a fluid, in particular a gas. The airbag is deployed due to the inflowing fluid within a short time range between 10 ms and 50 ms between an occupant and parts of the interior of the motor vehicle, forming a cushion, thus preventing the occupant from colliding with hard parts of the vehicle interior such as, for example, a steering wheel.

The fluid is regularly provided in a gas generator with a high pressure between 50 bar and 1000 bar. The gas generator can be a so-called hot gas generator, in which a fluid of this type is generated by a pyrotechnic combustion reaction or can also be a so-called cold gas generator, in which a fluid which is under pressure is already stored. A combined design as hybrid gas generators is also possible.

The impact protection system is usually triggered shortly after the moment of impact, i.e., only when the impact has already occurred. However, impact protection systems are also already being planned which, thanks to suitable sensors and evaluation of the signals thereof, recognize a time at which an impact is unavoidable. This time lies in the so-called pre-crash phase and, therefore, before the actual moment of impact. It is envisaged that this information be used to activate the impact protection system even before the impact in order to thus be able to protect the occupants of a vehicle from injuries even better.

The utilization of two-stage or multi-stage gas generators is in particular planned for this. A specific volumetric flow of the fluid is emitted in each case in two or more successive phases and introduced into the airbag by means of a control device for controlling the volumetric flow, with a valve arrangement. The corresponding opening and closing movements of the control apparatus must take place within a few milliseconds and work against high fluid pressures.

A control device and an impact protection system of the type mentioned in the introduction are disclosed, for example, in DE 10 2015 209 019 A1. The impact protection system for a motor vehicle comprises a gas generator for storing a gas under pressure and an airbag and a control device for controlling a volumetric flow of the gas under pressure into the airbag. The control device comprises a main valve, in the main valve body of which there is a stepped through-opening and a correspondingly stepped main valve piston which is axially guided in the through-opening of the main valve body. In addition, the control device has an electrically actuatable pilot valve with a pilot valve piston and a pilot valve inlet bore. The main valve piston divides the through-opening into a control chamber fluidically connected to the pilot valve via the pilot valve inlet bore and an antechamber fluidically connected to the fluid outlet channel of the gas generator, wherein the main valve has an overflow channel which fluidically connects the antechamber and the control chamber to one another. Within the main valve body, a discharge bore for draining the gas into the airbag branches off from the through-opening, wherein by means of the gas and depending on a position of the pilot valve piston, the main valve piston seals the at least one discharge bore in a closed position and exposes the at least one discharge bore in an open position.

However, a disadvantage of a control device of this type is in particular that a fluid pressure that actually builds up in the control chamber deviates to a relatively large extent from the necessary activation pressure of the main valve piston for performing an opening movement and/or a closing movement and, therefore, ultimately for opening and closing the discharge bore. This results in a correspondingly long response time of the main valve piston.

SUMMARY

It is therefore a first object of the embodiments to indicate a control device for a gas generator for controlling a volumetric flow of a fluid, which is stored under pressure, for filling an airbag of a motor vehicle, which guarantees a rapid response of the main valve piston and, therefore, a rapid opening and closing of the discharge bore. A second object of indicating an impact protection system for a motor vehicle having a control device, in which a rapid response of the main valve piston and, therefore, a rapid opening and closing of the discharge bore are guaranteed. It is a third object to provide a method for operating a control device, by means of which a rapid response of the main valve piston and, therefore, a rapid opening and closing of the discharge bore are made possible.

The first object is achieved according to the features of claim 1. Advantageous embodiments and further developments are set out in the subclaims and the following description.

A control device for a gas generator for controlling a volumetric flow of a fluid, which is stored under pressure, for filling an airbag of a motor vehicle accordingly comprises a valve arrangement, wherein the valve arrangement has a main valve having a main valve body with a through-opening and a main valve piston axially movable in the through-opening of the main valve body, and an electrically actuatable pilot valve with a pilot valve piston and a pilot valve inlet bore. The main valve piston divides the through-opening into a control chamber fluidically connected to the pilot valve via the pilot valve inlet bore and an antechamber fluidically connectable to the gas generator, wherein the main valve has an overflow channel which fluidically connects the antechamber and the control chamber to one another. Within the main valve body, at least one discharge bore for draining the fluid into the airbag branches off from the through-opening, wherein by means of the fluid and depending on a position of the pilot valve piston, the main valve piston seals the at least one discharge bore in a first operating position and exposes the at least one discharge bore in a second operating position.

According to an embodiment, in order to reduce a response time of the main valve piston, the valve arrangement has a means for controlling a fluid pressure in the control chamber, wherein the means for controlling a fluid pressure is configured to bring or hold the fluid pressure in the control chamber to/at a pressure which lies in a predefined tolerance range around an activation pressure of the main valve piston.

A particularly rapid filling of the airbag and a filling, which is as exact as possible, with a predefined fluid filling quantity in the individual phases are in particular dependent on the respective activation time of the main valve piston. The fluid pressure actually building up in the control chamber of the main valve up to the next opening movement or closing movement of the main valve piston and, in particular, the amount of deviation from the respectively necessary activation pressure of the main valve piston for performing the corresponding movement have a significant influence on the activation time of the main valve piston. Hence, the embodiments provide a means for controlling the fluid pressure in the control chamber, wherein the means is configured to bring or hold the fluid pressure in the control chamber to/at a pressure which lies in a predefined tolerance range around the activation pressure of the main valve piston, in particular corresponds roughly to the activation pressure of the main valve piston.

The advantage of the configuration is that a control device is provided as a result, which guarantees a rapid response of the main valve piston and, therefore, a rapid opening and closing of the discharge bore.

The movement and, therefore, the position of the main valve piston and, as a consequence, in particular the volumetric flow into the airbag are substantially controlled via the electrically actuatable pilot valve. The pilot valve is preferably configured as a solenoid valve. In addition, the pilot valve can be configured as a normally closed pilot valve and can have a compression spring which biases the pilot valve piston into a closed position, i.e., into a position in which the pilot valve piston seals the pilot valve inlet bore. However, the pilot valve can also be configured as a normally open pilot valve. The pilot valve is then kept actively closed by energizing it and opened by removing the current. To this end, a compression spring is advantageously provided, which biases the pilot valve into a defined opening position.

The activation pressure of the main valve piston is that theoretical pressure which is required to move the main valve piston. This comprises both a movement in the direction of the first operating position and a movement in the direction of the second operating position. During a movement in the direction of the first operating position, the activation pressure of the main valve piston is that pressure within the control chamber which is at least necessary in order to move the main valve piston into the first operating position. During a movement in the direction of the second operating position, the activation pressure of the main valve piston is that pressure within the control chamber which may exist at most in order to move the main valve piston into the second operating position.

In addition, the value of the activation pressure can vary, in particular depending on the fluid pressure supplied by the gas generator at the respective time and can decrease correspondingly when the fluid pressure supplied by the gas generator decreases, in particular over the period of filling the airbag.

That pressure which lies in a predefined tolerance range around the activation pressure of the main valve piston is a pressure which preferably lies as close as possible to the activation pressure of the main valve piston without exactly corresponding to the activation pressure. In particular, this is to be understood to be that pressure which lies as close as possible to the activation pressure, but which only just does not bring about any movement of the main valve piston.

The predefined tolerance range defines the limits within which the fluid pressure in the control chamber is brought or held around the activation pressure of the main valve piston. In particular, depending on the operating position of the main valve piston, this can be an upper or a lower limit. That is to say that if the main valve piston is located in the first operating position, an upper limit is in particular defined by the predefined tolerance range; if the main valve piston is located in the second operating position, a lower limit is in particular defined by the predefined tolerance range.

The volumetric flow of the fluid, in particular of a gas, is defined by the volume of the fluid which flows through a particular cross-section per unit of time (V/t).

The fluid can in particular flow from the valve chamber into the control chamber through the overflow channel of the main valve, which fluidically connects the antechamber and the control chamber to one another, wherein a specific volumetric flow can flow through the overflow channel mainly as a function of a pressure difference between the valve chamber and the control chamber.

If the gas generator is therefore activated and fluid stored under pressure is therefore provided, the fluid pressure in the antechamber increases and moves the main valve piston into the second operating position, in which it exposes the at least one discharge bore. Fluid flows via the overflow channel into the control chamber, as a result of which the fluid pressure from the control chamber also acts on the main valve piston. That is to say that, due to the pressure conditions in the control chamber and the valve chamber and depending on the geometric design of the main valve body, corresponding forces from the control chamber and the valve chamber act on the main valve body, wherein the main valve piston is moved correspondingly in the event of a disparity of forces.

In an advantageous embodiment, the activation pressure is dependent on the fluid pressure supplied by the gas generator at the respective time, wherein the activation pressure preferably decreases correspondingly with a decrease in the fluid pressure supplied by the gas generator over the period of filling the airbag.

In a further advantageous embodiment, the means for controlling a fluid pressure is configured to bring or hold the fluid pressure in the control chamber to/at the respective pressure which lies in a predefined tolerance range around the respective activation pressure of the main valve piston.

In a further advantageous embodiment, the means for controlling the fluid pressure is configured as an electrical control apparatus which applies an actuation signal in a pulse-width modulated form to the pilot valve. In particular, depending on the duty cycle, that is to say the relationship between the pulse duration and the period of the actuation signal, a corresponding alternating and, in each case, brief opening and closing of the pilot valve, more precisely of the pilot valve inlet bore, is produced over a certain period of time as a result. Thus, a corresponding volumetric flow of the fluid can, in each case, be conducted away from the control chamber, for example in the short opening phases, via the pilot valve inlet bore and the fluid pressure in the control chamber can be lowered. In this way, the fluid pressure in the control chamber can be held at a specific fluid pressure which only deviates slightly from the activation pressure of the main valve piston. As a result, the activation time of the main valve piston for the next opening movement or closing movement is significantly reduced or a rapid response of the main valve piston is guaranteed.

In a further advantageous embodiment, the means for controlling the fluid pressure is a pressure reducer arranged on and/or in the main valve. The pressure reducer advantageously comprises a valve with an input side and an output side and a pressure sensor, wherein the pressure sensor detects the prevailing pressure in the control chamber, and wherein at least the valve is arranged, for example, in a bore in the main valve body or in the main valve piston, in particular in the overflow channel. The valve is expediently arranged with its output side adjacent to the control chamber. In particular, the pressure reducer ensures that a specific fluid pressure, which deviates only slightly from the activation pressure of the main valve piston, is not exceeded in the control chamber. To this end, the valve is closed more and more as the pressure in the control chamber increases until the valve is finally completely closed on reaching the specific fluid pressure. Alternatively or additionally, the means for controlling the fluid pressure can also be configured as a pressure compensator arranged on and/or in the main valve or a flow-regulating valve arranged on and/or in the main valve.

In a further advantageous embodiment, the pressure reducer comprises a valve with an input side and an output side, wherein the valve is arranged in a bore in the main valve body or in the main valve piston and with its output side adjacent to the control chamber, and wherein the valve is configured in such a manner that the fluid pressure in the control chamber, which lies in a predefined tolerance range around the activation pressure of the main valve piston, is not exceeded.

The pressure reducer is preferably configured in such a manner that if an increase in pressure is present in the control chamber the valve is gradually closed more and more, and on reaching the fluid pressure in the control chamber which lies in a predefined tolerance range around the activation pressure of the main valve piston, the valve is substantially completely closed.

The means for controlling the fluid pressure can expediently also be configured as a combination of a pressure reducer and/or a pressure compensator and/or a flow-regulating valve with an electrical control device which applies an actuation signal in a pulse-width modulated form to the pilot valve.

In a further advantageous embodiment, the overflow channel is configured as a piston bore in the main valve piston. The fluid can flow through the piston bore from the valve chamber into the control chamber and, consequently, to the opposite side of the piston, wherein a specific volumetric flow can flow through the piston bore, in particular as a function of a pressure difference between the valve chamber and the control chamber.

In a further advantageous embodiment, the main valve piston has a first pressure-action surface facing the control chamber and a second pressure-action surface facing the antechamber, wherein the first pressure-action surface is larger than the second pressure-action surface. The pressure-action surfaces of the main valve piston of different sizes can, for example, be realized by different diameters of the main valve piston in the region of the control chamber and in the region of the antechamber. The area ratios of these diameters of the main valve piston result in an equilibrium of forces, provided that the fluid pressure in the control chamber is correspondingly lower than the fluid pressure in the antechamber. The main valve piston can consequently switch, i.e., be activated, at the latest when the fluid pressure in the control chamber and in the antechamber is the same, and can in particular move into the first operating position, in which it seals the at least one discharge bore.

In a further advantageous embodiment, the valve arrangement comprises a pressure sensor for detecting the fluid pressure prevailing in the control chamber. The pressure sensor is preferably arranged in the control chamber in order to detect the fluid pressure directly in the control chamber. In the case of a configuration of the means for controlling the fluid pressure as a pressure reducer arranged on and/or in the main valve, wherein the pressure reducer comprises a pressure sensor, the pressure sensor is in particular formed by the pressure sensor of the pressure reducer.

In a further advantageous embodiment, the predefined tolerance range is defined by a maximum permissible deviation from the activation pressure, wherein the predefined tolerance range or the maximum permissible deviation is 30%, preferably 20%, particularly preferred 10%. Therefore, a particularly rapid response of the main valve piston is made possible.

The second object is achieved according to the features of claim 8.

The impact protection system according to an embodiment for a motor vehicle comprises a gas generator for storing a fluid under pressure and an airbag, wherein the gas generator is configured to provide the fluid for the airbag in response to an activation signal. The impact protection system has a control device for controlling a volumetric flow of the fluid stored under pressure for filling the airbag, wherein the antechamber of the through-opening of the main valve is fluidically connected to a fluid outlet channel of the gas generator.

The advantages and preferred embodiments described for the control device also apply correspondingly to the impact protection system.

The impact protection system further advantageously has at least one sensor which, in the event of an impact and/or prior to an impact, detects parameters for calculating a probable impact development and transfers these to a control unit which is in particular designed to determine the probable impact development from the detected parameters and, based on this, to determine the volumetric flow of the fluid into the airbag required at any time of the impact development.

The third object is achieved according to the features of claim 9.

The method for operating a control device comprises the following steps:

providing a fluid which is stored under pressure; and controlling the fluid pressure in the control chamber using the means for controlling a fluid pressure at a pressure, which lies in a predefined tolerance range around the activation pressure of the main valve piston, in order to reduce the response time of the main valve piston.

The advantages and preferred embodiments described for the control device also apply correspondingly to the method.

In an advantageous embodiment, the activation pressure is dependent on the fluid pressure supplied by the gas generator at the respective time, the activation pressure preferably decreases correspondingly with a decrease in the fluid pressure supplied by the gas generator over the period of filling the airbag, wherein, during the step of controlling the fluid pressure in the control chamber, the fluid pressure in the control chamber is brought or held to/at the respective pressure which lies in a predefined tolerance range around the respective activation pressure of the main valve piston.

BRIEF DESCRIPTION OF THE DRAWINGS

Exemplary embodiments are explained in greater detail below with reference to a drawing, wherein.

Corresponding parts are constantly provided with the same reference numerals in all figures.

DETAILED DESCRIPTION

Figure 1:
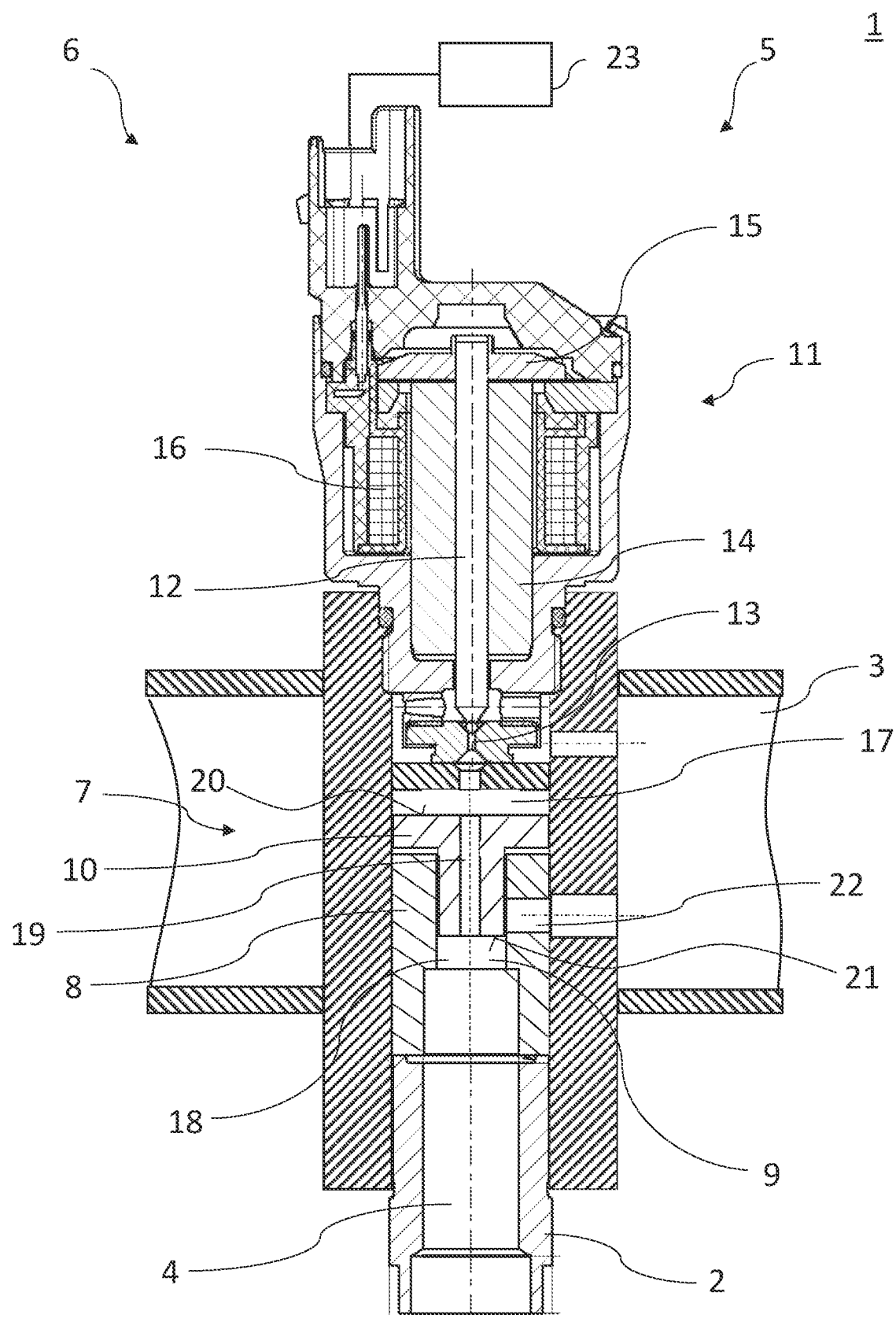
FIG. 1 shows an impact protection system in a schematic longitudinal sectional view.

In FIG. 1, an exemplary embodiment of an impact protection system 1 is depicted in a schematic sectional view. The impact protection system 1 for a motor vehicle comprises a gas generator 2 configured as a cold gas generator for storing a fluid under pressure configured as gas and an airbag 3. To this end, the gas generator 2 is configured to provide the fluid for the airbag 3 in response to an activation signal. For this purpose, the gas generator 2 has a closure element (not depicted) configured as a rupture disk for sealing a fluid outlet channel 4 of the gas generator 2, wherein the closure element is destroyed in the event of an impact so that the pressurized fluid can escape from the gas generator 2.

The impact protection system 1 further has a control device 5 for controlling a volumetric flow of the fluid stored under pressure for filling the airbag 3, wherein the control device 5 comprises a valve arrangement 6.

The valve arrangement 6 comprises a main valve 7 having a main valve body 8 with a through-opening 9 and a main valve piston 10 axially movable in the through-opening 9 of the main valve body 8.

The valve arrangement 6 further has an electrically actuatable pilot valve 11 with a pilot valve piston 12 and a pilot valve inlet bore 13. The pilot valve piston 12 interacts with the pilot valve inlet bore 13 and seals or opens the pilot valve inlet bore 13 as a function of its position. The pilot valve 11 further comprises a fixed pole piece 14 and a movable armature 15, wherein the armature 15 is coupled to the pilot valve piston 12. As a result, the armature 15 transmits its movement to the pilot valve piston 12. In order to induce the movement of the armature 15, the pilot valve 11 comprises a coil 16 which is energized for this purpose. When the coil 16 is activated, a magnetic field is built up in the magnetic circuit and a magnetic force is formed between the armature 15 and the pole piece 14. This magnetic force moves the armature 15 and, consequently, the pilot valve piston 12.

The main valve piston 10 of the main valve 7 divides the through-opening 9 into a control chamber 17 fluidically connected to the pilot valve 11 via the pilot valve inlet bore 13 and an antechamber 18 fluidically connected to the fluid outlet channel 4 of the gas generator 2. The main valve 7 further has an overflow channel 19 configured as a piston bore in the main valve piston 10, which fluidly connects the antechamber 18 and the control chamber 17 to one another.

The main valve piston 10 has a first pressure-action surface 20 facing the control chamber 17 and a second pressure-action surface 21 facing the antechamber 18, wherein the first pressure-action surface 20 is larger than the second pressure-action surface 21. The pressure-action surfaces 20, 21 of the main valve piston 10 of different sizes can be realized, for example by different diameters of the main valve piston 10 in the region of the control chamber 17 and in the region of the antechamber 18. The area ratios of these diameters of the main valve piston 10 result in an equilibrium of forces, provided that the fluid pressure in the control chamber 17 is correspondingly lower than the fluid pressure in the antechamber 18. The main valve piston 10 can consequently switch, i.e., be activated, at the latest when the fluid pressure in the control chamber 17 and in the antechamber 18 is the same, and can move into a first operating position.

Within the main valve body 8, a discharge bore 22 for draining the fluid into the airbag 3 branches off from the through-opening 9. By means of the fluid or the fluid pressure and depending on a position of the pilot valve piston 12, the main valve piston 10 seals the discharge bore 22 in a first operating position and exposes the discharge bore 22 in a second operating position.

In order to reduce a response time of the main valve piston 10, the valve arrangement 6 has a means 23 for controlling a fluid pressure in the control chamber 17, wherein the means 23 is configured to bring or hold the fluid pressure in the control chamber 17 to/at a pressure which lies in a predefined tolerance range of 30% around the activation pressure of the main valve piston 10. The means 23 for controlling the fluid pressure is configured as an electrical control apparatus which applies an actuation signal in a pulse-width modulated form to the pilot valve 11.

In particular, depending on the duty cycle, that is to say the ratio between the pulse duration and period of the actuation signal, a movement of the pilot valve piston 12 and, consequently, a corresponding alternating and in each case brief opening and closing of the pilot valve 11, more precisely of the pilot valve inlet bore 13, is produced as a result multiple times over a specific period of time. Thus, a corresponding volumetric flow of the fluid can be conducted away, for example, in each case from the control chamber 17 via the pilot valve inlet bore 13 and the fluid pressure in the control chamber 17 can be lowered during the short opening phases. In this way, the fluid pressure in the control chamber 17 can be held at a fluid pressure in the predefined tolerance range and, consequently, at a fluid pressure which only deviates slightly from the activation pressure of the main valve piston 10. As a result, the activation time of the main valve piston 10 for the next opening movement or closing movement is significantly reduced or a rapid response of the main valve piston 10 is guaranteed.

The impact protection system 1 acts as follows:

The pilot valve 11 is configured as a normally open pilot valve 11, i.e., the pilot valve piston 12 remains in any position in the unenergized state of the coil 16. The pilot valve piston 12 can be pushed into an open position without any magnetic force and without being acted upon by current as required. The pilot valve piston 12 is located in a closed position when it is acted upon by current.

Following the activation of the gas generator 2, the fluid pressure in the through-opening 9 and, consequently, in the antechamber 18 increases. The pilot valve 11 is closed, that is to say the pilot valve piston 12 is moved into a closed position. The fluid pressure is present at the second pressure-action surface 21 of the main valve piston 10. The main valve piston 10 is, as a result, pressed axially in the direction of the control chamber 17. As a result, the discharge bore 22 is first opened and fluid is conducted away into the airbag 3. Due to the stagnation pressure at the main valve piston 10 in the antechamber 18, the fluid flows, in addition, into the control chamber 17 via the overflow channel 19. As a result, the fluid pressure in the control chamber 17 increases. On reaching the activation pressure, which is now that pressure which is at least necessary to move the main valve piston 10 into the first operating position and, therefore, into the closed position, the main valve piston 10 moves in the direction of the antechamber 18 and the discharge bore 22 is sealed.

If the pilot valve 11 is opened in a next step, that is to say the pilot valve piston 12 is pushed into the open position, fluid flows via the pilot valve inlet bore 13 from the control chamber 17 and the fluid pressure in the control chamber 17 is lowered. On reaching the activation pressure, which is that pressure which is necessary to move the main valve piston 10 into the second operating position and, therefore, into the open position, the main valve piston 10 moves in the direction of the control chamber 17 and the discharge bore 22 is opened, as a result of which fluid is metered to the discharge bore 22 and, subsequently, into the airbag 3.

After the discharge bore 22 has been opened, a movement of the pilot valve piston 12 and, consequently, a corresponding alternating and, in each case, brief opening and closing of the pilot valve 11, more precisely of the pilot valve inlet bore 13, is produced multiple times by the means 23 for controlling the fluid pressure in the control chamber 17. In this way, the fluid pressure in the control chamber 17 is held at a fluid pressure in the predefined tolerance range and, consequently, at a fluid pressure which correspondingly only deviates slightly from the activation pressure of the main valve piston 10. As a result, the activation time of the main valve piston 10 is significantly reduced for the next closing movement or a rapid response of the main valve piston 10 is guaranteed.

The process of opening and closing the discharge bore 22 is repeatable and is, in particular, performed as a function of an impact development, which makes it possible to adapt targeted metering of the fluid into the airbag 3 thereto. In the exemplary embodiment shown here, the means 23 for controlling the fluid pressure merely acts following the first active opening of the pilot valve 11 and the opening of the main valve 7 or main valve piston 10 thereby caused. It is also possible, however, that the means 23 for controlling the fluid pressure acts for the first time and/or additionally after one or each further opening of the pilot valve 11 and the respective opening of the main valve piston 10 thereby caused. In addition, it is possible for the means 23 for controlling the fluid pressure to act correspondingly alternatively or additionally following a closure of the pilot valve 11 and the closure of the main valve piston 10 thereby caused.

Figure 2:
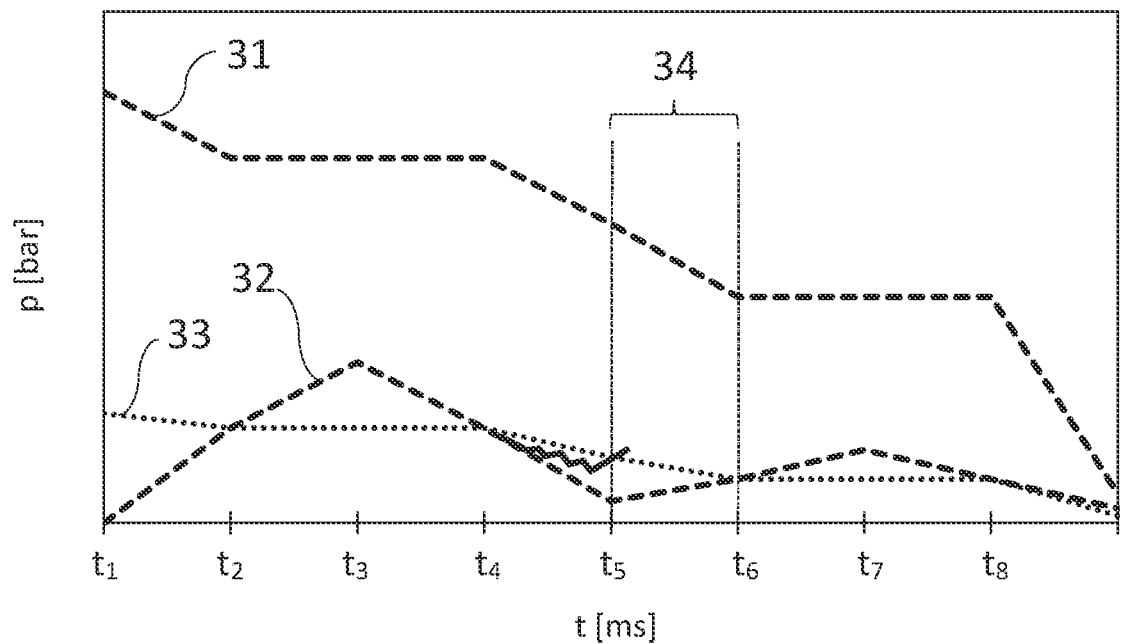
FIG. 2 shows a schematic diagram which depicts various pressure curves of the impact protection system from FIG. 1 as a function of the time.

FIG. 2 shows a schematic diagram which depicts different pressure curves of the impact protection system 1 from FIG. 1 as a function of the time t.

A pressure curve of the gas generator fluid pressure, that is to say of the fluid pressure prevailing in the gas generator 2 and which can be supplied by the gas generator 2, is provided with the reference numeral 31. A pressure curve of the control chamber fluid pressure, that is to say of the prevailing fluid pressure in the control chamber 17, is provided with the reference numeral 32. The graph denoted by the reference numeral 33 depicts the necessary activation pressure for the main valve piston 10 to respond in order to perform an opening movement and/or a closing movement and, therefore, ultimately to open and close the discharge bore 22. That is to say, the activation pressure 33 is that theoretical pressure within the control chamber 17, which is required to move the main valve piston 10. This comprises both a movement in the direction of the first operating position and a movement in the direction of the second operating position.

The behavior of the impact protection system 1 or of the corresponding pressure curves without the means 23 for controlling the fluid pressure in the control chamber 17, that is to say the control chamber fluid pressure 32, is described first below.

Following the activation of the gas generator 2 at time $t_1$ and when the pilot valve 11 is closed, the discharge bore 22 is first opened and fluid flows from the gas generator 2 into the airbag 3 via the discharge bore 22 and into the control chamber 17 via the overflow channel 19. As a result, the gas generator fluid pressure 31 decreases and the control chamber fluid pressure 32 first increases. At time $t_2$, the control chamber fluid pressure 32 reaches the activation pressure 33, as a result of which the main valve piston 10 is moved in the direction of the antechamber 18 and the discharge bore 22 is sealed. Consequently, fluid no longer flows into the airbag 3 via the discharge bore 22. Admittedly, fluid still flows into the control chamber 17 via the overflow channel 19, which leads to a further increase in the control chamber fluid pressure 32.

If the pilot valve 11 is opened in a next step at time $t_3$, that is to say the pilot valve piston 12 is pushed into the open position, fluid flows out of the control chamber 17 via the pilot valve inlet bore 13 and the control chamber fluid pressure 32 is gradually lowered as a result. However, only on reaching the activation pressure 33 at time to and, therefore, only after a relatively long period of time does the main valve piston 10 then move in the direction of the control chamber 17, and the discharge bore 22 is opened and fluid is thus metered into the airbag 3 via the discharge bore 22. In addition, fluid continues to flow out of the control chamber 17 through the pilot valve inlet bore 13 which continues to be open, which leads to a further drop in the control chamber fluid pressure 32.

At time is the pilot valve 11 is closed, as a result of which the control chamber fluid pressure 32 increases again. However, only on reaching the activation pressure 33 at time $t_6$ and, therefore, in turn only after a relatively long period of time does the main valve piston 10 move in the direction of the antechamber 18, and the discharge bore 22 is sealed.

At time $t_7$, the pilot valve 11 is opened again and the control chamber fluid pressure 32 is lowered. On reaching the activation pressure 33 at time $t_8$, the main valve piston 10 moves in the direction of the control chamber 17 and the discharge bore 22 is opened, as a result of which fluid is again metered into the airbag 3 via the discharge bore 22.

It can be seen from the depicted pressure curves that there is, in each case, a certain loss of time at the switching times of the pilot valve 11 at times $t_3$, $t_5$ and $t_7$ between the opening or closing of the pilot valve 11 and the opening or closing of the main valve 7 thereby caused in each case. That is to say that a temporal delay 34 of this type exists per se, for example, between the closing of the pilot valve 11 at time $t_5$ and the closing of the main valve thereby caused (only) at time $t_6$ and is plotted here, by way of example, in FIG. 2.

In order to now reduce the activation time of the main valve piston 10 for a closing movement or to guarantee a rapid response of the main valve piston 10, in the present exemplary embodiment, a movement of the pilot valve piston 12 and, consequently, a corresponding alternating and, in each case, brief opening and closing of the pilot valve 11, more precisely of the pilot valve inlet bore 13, is produced multiple times by the means 23 for controlling the fluid pressure in the control chamber 17 at or as of time $t_4$. In this way, the control chamber fluid pressure 32 is held in the predefined tolerance range around the activation pressure 33 and, consequently, at a fluid pressure which deviates only slightly from the activation pressure 33 of the main valve piston 10. In FIG. 2, the resulting control chamber fluid pressure 32 due to the means 23 for controlling the fluid pressure in the control chamber 17 as of time to is depicted with a solid line.

It can be seen from FIG. 2 that at time $t_5$, at which the pilot valve 11 is closed (again), the control chamber fluid pressure 32 reaches the activation pressure 33 of the main valve piston 10, virtually without, or compared to the pressure curve, without the means 23 for controlling the fluid pressure only with a very small loss of time, and, consequently, the main valve piston 10 is already responding at this time and seals the discharge bore 22. That is to say, this guarantees a rapid response of the main valve piston 10 and, therefore, a rapid closing of the discharge bore 22. The temporal delay 34, that is to say the loss of time between the closing of the pilot valve 11 and the closing of the main valve 7 or of the main valve piston 10 thereby caused is virtually completely reduced in this case.

The correspondingly adapted, modified pressure curves over the further course of time are not depicted for the sake of clarity, but should be obvious to a person skilled in the art based on the above explanations.

At this point it should be pointed out again that in the case of the exemplary embodiment shown here, the means 23 for controlling the fluid pressure merely acts after the first active opening of the pilot valve 11 and the opening of the main valve 7 thereby caused at time ta. However, it is of course also possible that the means 23 for controlling the fluid pressure also, alternatively or additionally, acts after one or all other switching times of the pilot valve 11 at times $t_1$, $t_5$, $t_7$ and the closing or opening of the main valve 7 thereby caused at times $t_2$, $t_6$, $t_8$.

Figure 3:
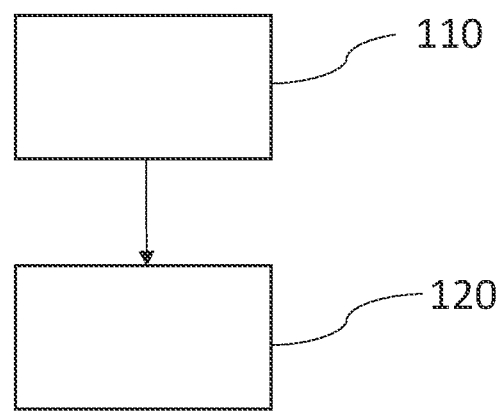
FIG. 3 shows a flow chart of a method for operating the control device of the impact protection system from FIG. 1.

FIG. 3 shows a flow chart of a method 100 for operating the control device 5 of the impact protection system 1 from FIG. 1.

In a step 110, the fluid stored under pressure is first provided and, in particular, conducted into the through-opening 9 and the control chamber 17 of the main valve 7. In a step 120 (at or as of time ta) the fluid pressure in the control chamber 17 is controlled at a pressure, that is to say brought or held to/at a pressure which lies in a predefined tolerance range around the activation pressure of the main valve piston 10, using the means 23 for controlling the fluid pressure. As a result, the response time of the main valve piston 10 is reduced.

The invention claimed is:
1. A control device for a gas generator for controlling a volumetric flow of a fluid, the control device comprising:
 a valve arrangement comprising:
  a main valve comprising:
   a main valve body with a through-opening; and
   a main valve piston axially movable in the through-opening of the main valve body; and
  an electrically actuatable pilot valve comprising:
   a pilot valve piston; and
   a pilot valve inlet bore, wherein the main valve piston divides the through-opening into a control chamber fluidically connected to the pilot valve via the pilot valve inlet bore and an antechamber fluidically connectable to the gas generator, wherein the main valve further comprises an overflow channel which fluidically connects the antechamber and the control chamber, wherein the main valve body comprises at least one discharge bore for draining the fluid into an inflation target from the through-opening, and wherein by means of the fluid and depending on a position of the pilot valve piston, the main valve piston seals the at least one discharge bore in a first operating position and exposes the at least one discharge bore in a second operating position; and
 a control apparatus configured to hold a pressure of the fluid in the control chamber to be within a tolerance range from which a first force exerted by the fluid in the control chamber on the main valve piston is in equilibrium with a second force exerted by the fluid in the antechamber on the main valve piston.

2. The control device according to claim 1, wherein the gas generator is configured to control a pressure of the fluid in the antechamber.

3. The control device according to claim 2, wherein the equilibrium decreases correspondingly with a decrease in pressure of the fluid in the antechamber supplied by the gas generator over a period of time of filling the inflation target.

4. The control device according to claim 3, wherein the control apparatus is configured to bring the pressure of the fluid in the control chamber to be within the tolerance range from which the first force exerted by the fluid in the control chamber on the main valve piston is in equilibrium with the second force exerted by the fluid in the antechamber on the main valve piston.

5. The control device according to claim 1, wherein the control apparatus comprises an electrical control apparatus configured to apply an actuation signal in a pulse-width modulated form to the pilot valve to control the pressure of the fluid in the control chamber.

6. The control device according to claim 1, wherein the control apparatus comprises a pressure reducer comprising a valve with an input side and an output side, the valve is arranged in a bore in the main valve body or in the main valve piston and with its output side adjacent to the control chamber, and the valve is configured to control the pressure of the fluid in the control chamber.

7. The control device according to claim 6, wherein the pressure reducer is configured in response to an increase of the pressure of the fluid in the control chamber to gradually close the valve, and in response to the pressure of the fluid in the control chamber being within the tolerance range, the valve is substantially completely closed.

8. The control device according to claim 1, wherein the overflow channel is configured as a piston bore in the main valve piston.

9. The control device according to claim 1, wherein the main valve piston comprises a first pressure-action surface facing the control chamber at which the first force is exerted and a second pressure-action surface facing the antechamber at which the second force is exerted, and wherein the first pressure-action surface is larger than the second pressure-action surface.

10. The control device according to claim 1, wherein the valve arrangement comprises a pressure sensor configured to detect the pressure of the fluid in the control chamber.

11. The control device according to claim 10, wherein the pressure sensor is arranged in the control chamber, and wherein the pressure sensor is configured to directly detect the pressure of the fluid in the control chamber.

12. The control device according to claim 1, wherein the predefined tolerance range is a deviation of 10% from the pressure of the fluid in the control chamber at which the first force is in equilibrium with the second force.

13. The control device according to claim 1, wherein the predefined tolerance range is a deviation of 20% from the pressure of the fluid in the control chamber at which the first force is in equilibrium with the second force.

14. The control device according to claim 1, wherein the predefined tolerance range is a deviation of 30% from the pressure of the fluid in the control chamber at which the first force is in equilibrium with the second force.

* * * * *